US008601096B2

(12) United States Patent
Balasuriya

(10) Patent No.: US 8,601,096 B2
(45) Date of Patent: Dec. 3, 2013

(54) METHOD AND SYSTEM FOR MULTI-MODAL COMMUNICATION

(75) Inventor: Senaka Balasuriya, Westmont, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1228 days.

(21) Appl. No.: 10/145,304

(22) Filed: May 14, 2002

(65) Prior Publication Data

US 2003/0217161 A1 Nov. 20, 2003

(51) Int. Cl.
*G06F 15/173* (2006.01)
(52) U.S. Cl.
USPC .......................................... 709/218; 709/230
(58) Field of Classification Search
USPC ......... 709/310, 101, 105, 202, 217, 208, 220, 709/221, 245, 218, 230, 254, 246, 231, 228, 709/227
See application file for complete search history.

(56) References Cited

U.S. PATENT DOCUMENTS

| | | | |
|---|---|---|---|
| 6,523,061 B1 | 2/2003 | Halverson et al. | |
| 6,557,032 B1 * | 4/2003 | Jones et al. | 709/220 |
| 6,567,787 B1 * | 5/2003 | Walker et al. | 705/16 |
| 6,574,595 B1 * | 6/2003 | Mitchell et al. | 704/242 |
| 6,631,418 B1 * | 10/2003 | Watkins | 709/231 |
| 6,678,715 B1 * | 1/2004 | Ando | 718/105 |
| 6,868,383 B1 * | 3/2005 | Bangalore et al. | 704/254 |
| 2001/0049603 A1 * | 12/2001 | Sravanapudi et al. | 704/270.1 |
| 2002/0032751 A1 * | 3/2002 | Bharadwaj | 709/218 |
| 2002/0035545 A1 * | 3/2002 | Ota et al. | 705/52 |
| 2002/0194388 A1 * | 12/2002 | Boloker et al. | 709/310 |
| 2003/0140113 A1 | 7/2003 | Balasuriya | |

OTHER PUBLICATIONS

Maes, Stephane H., "Multi-modal Web IBM Position," W3C/WAP Workshop, IBM Human Language Technologies, pp. 1-9.

* cited by examiner

*Primary Examiner* — Adnan Mirza

(57) ABSTRACT

A method and system for multi-modal communication has a terminal (102) with at least one input component (108) and at least one output component (112) coupled to a gateway (104) having a dialog manager (114). The system and method further has a content server (106) coupled to the dialog manager (114) wherein the content server (106) provides the dialog manager (114) with an encoded control command. Moreover, at least one input component (108) and at least one output component (112) are coupled to a control unit (110). The dialog manager (114) decodes the encoded control command, producing and providing a decoded control command to the control unit (110). In response to the decoded control command, the control unit (110) modifies at least one of the input components (108) and/or at least one of the output components (112).

25 Claims, 4 Drawing Sheets

METHOD AND SYSTEM FOR MULTI-MODAL COMMUNICATION

FIELD OF THE INVENTION

The invention relates generally to communication devices and methods and more particularly to communication devices and methods utilizing multi-modal communication.

BACKGROUND OF THE INVENTION

An emerging area of technology with terminal devices, such as hand-held devices, mobile phones, laptops, PDAs, internet appliances, desktop computers, or other suitable devices, is the application of multi-modal information transfer. Typically resident on the terminal devices is at least one browser, wherein the browser is a program which allows the user to enter information fetch requests, receive requested information, and navigate through content servers via internal, e.g. intranet, or external, e.g. internet, connections. The browser may be a graphical browser, voice browser, JAVA®-based application, software program application, or any other suitable browser as recognized by one of ordinary skill in the art.

Multi-modal technology allows a user to access information, such as voice information, data encryption, video information, audio information or other information, through at least one browser. More specifically, the user may submit an information fetch request in one mode, such as speaking a fetch request into a microphone, receive the requested information in any of a plurality of modes, such as the first mode, i.e. audible output, or a second mode, i.e. graphical display.

Within the terminal device, the browser may work in a manner similar to a standard web browser, such as NETSCAPE NAVIGATOR® resident on a computer connected to a network. The browser receives an information fetch request from an end user, commonly in the form of a universal resource indicator (URI), a bookmark, touch entry, key-entry, voice command, etc. Typically, the browser interprets the fetch request and then sends the information fetch request to the appropriate content server, such as a commercially available content server, e.g. a weather database via the internet, an intranet server etc.

Once the requested information is retrieved, the requested information is then provided back to the browser. Typically, the information is encoded as mark-up language for the browser to decode, such as hypertext mark-up language (HTML), wireless mark-up language (WML), extensive mark-up language (XML), Voice eXtensible Mark-up Language (VoiceXML), Extensible HyperText Markup Language (XHTML), or other such mark-up languages.

Concurrent with the emergence of multi-modal technology, concerns arise regarding the different types of browsers, e.g. graphical, voice, etc., seeking data from the variety of different content servers. One such concern is the manner in which information is either provided to the terminal or provided to the user from the terminal. Depending on the specific content server with which the browser is interacting, certain input and/or output components may need to be modified. For example, for security reasons, if a user is accessing a banking server, it may be advisable to disable the graphics display to avoid anyone overseeing possibly sensitive information and enable a specific encryption application for the secure transmission of sensitive user information.

Currently, a user may manually enable or disable specific input and output components via a graphical user interface (GUI). Although, the content server provider may prefer different modifications of the input and output components than the user has pre-set. Moreover, the user must then manually un-modify the input or output component when they desire different settings.

As such, there exists a need for an improved multi-modal communication device and method.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Generally, the method and system for multi-modal communication receives encoded control command from a content server, such as a commercially available content server, i.e. a banking server, an internal server disposed on an intranet, or any another server accessible via the network. The method and system further decodes the control command to generate a decoded control command and provides the decoded control command to a control unit, wherein the control unit modifies, such as enabling or disabling, various input and output components.

In response to the decoded command, the method and system disables at least an input component and/or an output component, where the input component may be a microphone disposed within an audio subsystem, a speech detector/controller, a speech recognition engine, a keypad, an input encoder, touch screen, a handwriting engine, etc., and wherein the output component may be a speaker disposed within the audio subsystem, a display, etc. Moreover, the method and system further consists of enabling at least one input component and/or at least one output component in response to the decoded control command. The method and system may also enable at least one input component or at least one output component without disabling any of the input or output components, or disable at least one input component or at least one output component without enabling any of the input or output components.

The method and system for multi-modal communication, prior to receiving an encoded control command, receives an information fetch request, such as a URI, which may be provided by a user or another suitable means. The information request is for requested information, such as personal information stored on a commercially available content server, weather information from a weather database, etc. The information request is provided to a dialog manager, such as a multi-modal browser, a graphical browser, a voice browser, or any other dialog manager. The method and system accesses the content server to retrieve the requested information, wherein the control command is encoded within the requested information.

Figure 1:
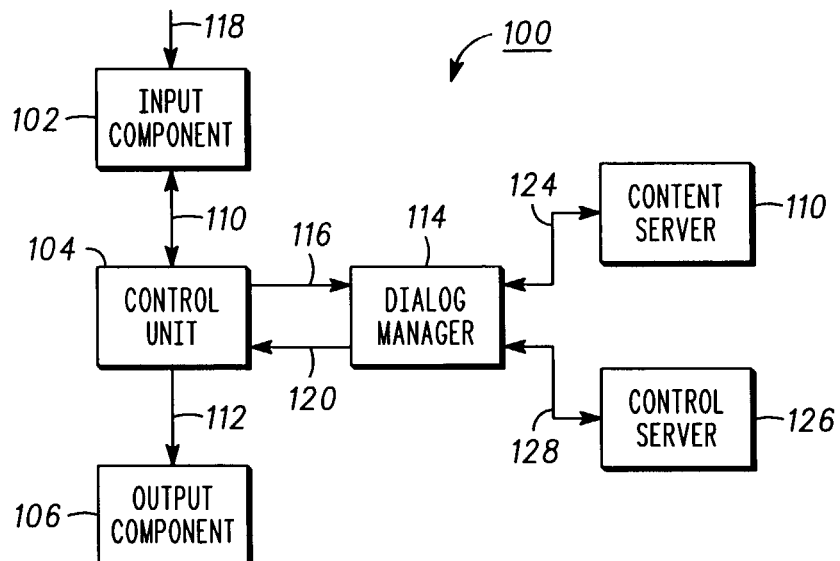
FIG. 1 illustrates a general block diagram of a multi-modal communication system receiving a control command in accordance with one embodiment of the present invention.

The present invention is illustrated, more specifically, with reference to FIGS. 1-5. FIG. 1 illustrates a multi-modal communication system for receiving an encoded control command. The system 100 includes an input component 102, a control unit 104 and an output component 106 coupled to the control unit 104 via connection 112. The input component 102 represents at least one of an input component for receiving or modifying an input signal. The output component 106 represents at least one component used to provide or modify an output signal. Moreover, the input component 102 is coupled to the control unit 104 via connection 110 and the output component is coupled to the control unit via connection 112. A dialog manager 114 is coupled to the control unit 104 via connection 116 for receiving an input command, such as 118, from an input component and coupled to the control unit 104 via connection 120 for providing an output command to the output component 106, through the control unit 104. A content server 122 is coupled to the dialog manager, via connection 124, for receiving information requests and providing the requested information from the content server 122 back to the dialog manager 114. The system 100 further contains a control server 126 coupled to the dialog manager 114 via connection 128, wherein the control server 126 contains a plurality of control commands which may be used by the control unit 104 to modify the input component 102 and/or the output component 106. FIG. 1 illustrates the content server 122 and the control server 126 as two separate servers, but as recognized by one skilled in the art, these servers may be disposed within a single content/control server.

An end user provides an information request, such as 118, for requested information to the input component 102. The input component 102 provides this information request to the dialog manager 114 through the control unit 104. Upon receiving the information request, the dialog manager 114 decodes the information request and then provides the information request to the content server 122, via connection 124.

The content server 122 provides the requested information, with a control command encoded therein, to the dialog manager 114. The dialog manager 114 decodes the control command by parsing out the control command from the requested information. This control command is then provided to the control unit 104 via connection 120, whereupon the control 104 modifies the input component 102 and/or the output component 106.

In another embodiment, the dialog manager 114 decodes the requested information and parses out a control command reference indicator, such as a URI. The dialog manager 114 then accesses the control server 126, via connection 128, to retrieve the control command as indicated by the reference indicator. The retrieved control command is then provided to the control unit 104 via connection 120 for the appropriate modification of the input component 102 and/or the output component 106.

The control unit 104, in response to the control command, performs at least one of a plurality of functions. Specifically, the control unit 104 modifies, either through enabling or disabling, at least one input component 102 or at least one output component 106. Moreover, the control unit 104 may modify multiple components, such as enabling the input component 102 while simultaneously disabling the output component 106.

The present invention provides for the reception of a control command, which is received by a dialog manager 114 where it is decoded, and provided to the control unit 104. In response to the control command provided from a content server 122, input component 102 and output component 106, may be enabled or disabled. For example, if a service from the content server 122 mandates that a certain audio disclaimer shall not be interrupted or terminated by the user, a control command is provided with the encoded information. The dialog manager 114 decodes the control command and provides the control command to the control unit 104 for disabling the input component 102, requiring the user to listen to the full disclaimer without being able to interrupt or terminate the audio transmission.

Figure 2:
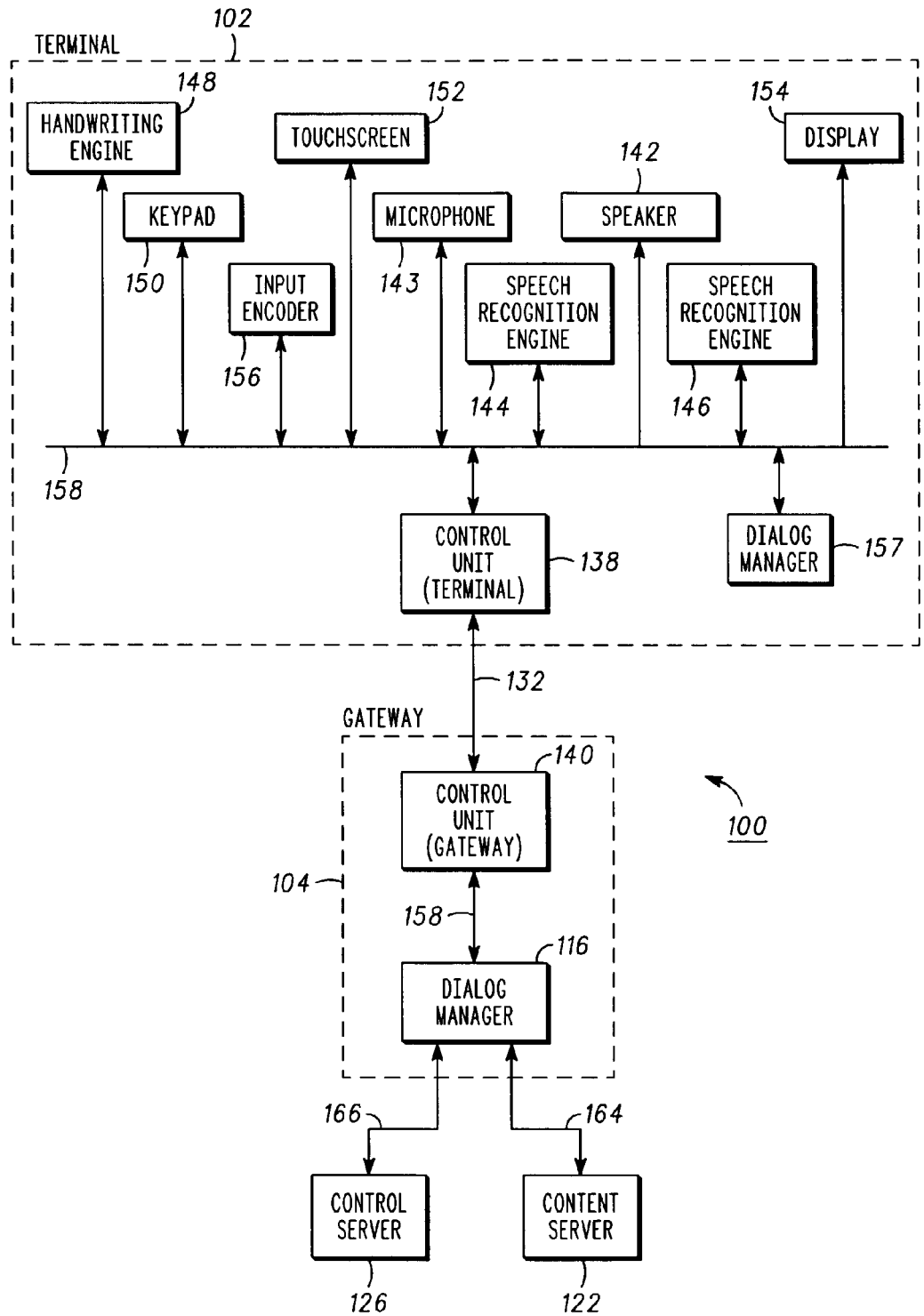
FIG. 2 illustrates a thin client multi-modal communication system for receiving a control command, in accordance with one embodiment of the present invention.

FIG. 2 illustrates a thin client embodiment of the multi-modal communication system 100 of FIG. 1, further illustrating input components and output components. The system 100 contains the terminal 102 having a terminal session control unit 138 operably coupled to a gateway control unit 140 disposed within a gateway 130 via connection 132. For clarification purposes, in FIG. 2, the terminal control unit 138 and the gateway control unit 140 were designated as control unit 104 of FIG. 1. The terminal 102 further contains a speaker 142, a microphone 143, a speech recognition engine 144, a speech detector/controller 146, a handwriting engine 148, a keypad 150, a touchscreen 152, a display 154, an input encoder 156 and a terminal dialog manager 157. As recognized by one of ordinary skill in the art, the touchscreen 152 and display 154 may be the same component, but provide for different forms of interaction, either as an input component or an output component and have therefore been separately illustrated.

Moreover, the terminal input and output components of FIG. 2 are illustrative, and not herein a conclusive list of suitable input and output components for use in the multi-modal communication system. The input components and output components are operably coupled to the terminal control unit 138 and each other via a bus, designated generally at 158. Furthermore, in the thin client embodiment illustrated in FIG. 2, the terminal dialog manager 157 includes contains a graphical browser and the dialog manager 116 disposed on the gateway includes a voice browser.

The system 100 operates as discussed above with reference to FIG. 1. For example, the microphone 143 receives an audio information request for requested information, such as request 118 in FIG. 1. The microphone 143 provides this request to the speech recognition engine 144 where it is recognized and provided as an input to the dialog manager 116 across bus 132.

As recognized by one skilled in the art, the input may be provided through any of the input components and further provided to the dialog manager 116, such as entered within the keypad 150 or entered on a touchscreen 152. The dialog manager 116 fetches the information from the designated content server 122 via connection 164. Contained within the requested information is the control command, which is decoded by the dialog manager 116. The dialog manager 116 decodes the control command and provides the control command to the gateway control unit 140 via connection 158. In another embodiment, the dialog manager 116 parses out a reference indicator, such as URI, and accesses the control server 106, via connection 166, to retrieve the control command.

The decoded control command is provided to the terminal control unit 138 from the gateway control unit 140, via connection 132. Whereupon, the terminal control unit 138 then modifies at least one input component and/or one output component in response to the decoded control command. As discussed with reference to FIG. 1, at least one input component may be enabled or disabled and/or at least one output component may be enabled or disabled.

For example, if the content server 106 represents a banking application, and a user is requested to enter a personal identification number [PIN], a control command may be provided to restrict a user from speaking the PIN into a microphone 143. Upon receiving the requested information, the dialog manager 114 decodes the control command, which is then provided to the terminal control unit 138, via the gateway control unit 140, and thereupon the audio subsystem is disabled so as to disable audio input. Moreover, the keypad 150 may be enabled and the input encoder 156 may be enabled to encode the information as it is provided from the user on the keypad 150. The input encoder 156 may be further enabled to provide a non-recognition character, such as an asterisk or other non-alphanumeric digit, upon the display 154 as each entry of the PIN is entered into the keypad 150. Thereupon, the system provides for the reception of control commands that can enable or disable specific input and/or output components on a terminal device.

Figure 3:
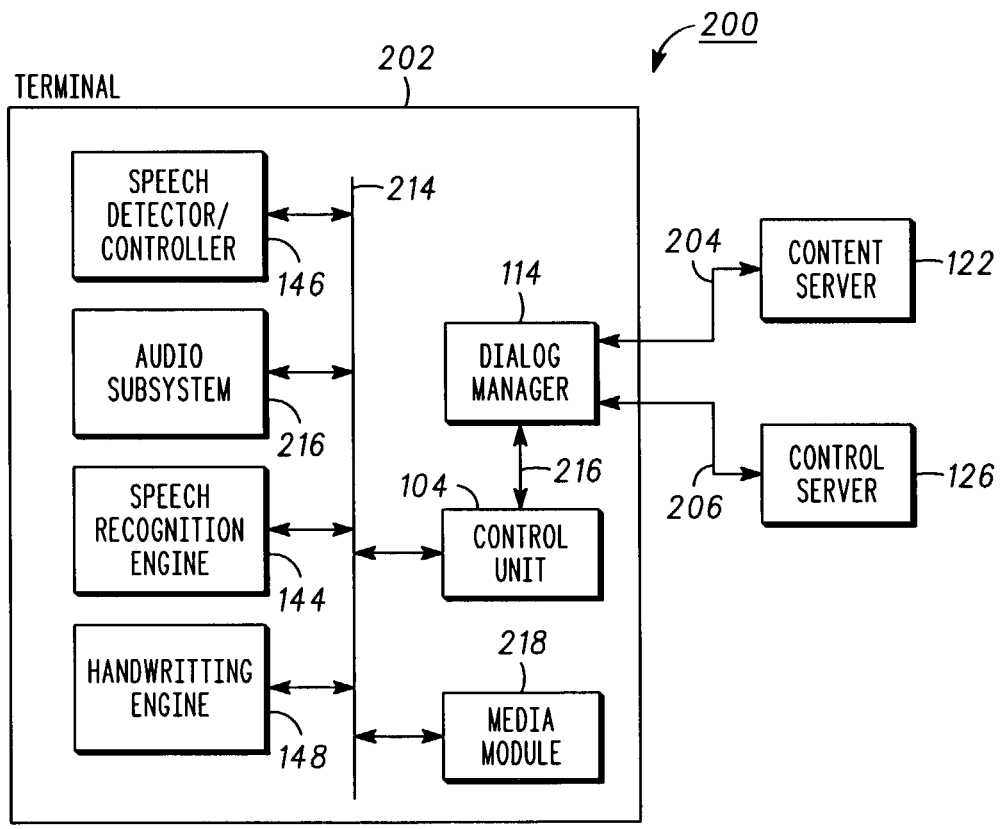
FIG. 3 illustrates a thick client multi-modal communication system for receiving a control command, in accordance with one embodiment of the present invention.

FIG. 3 illustrates a thick client embodiment of a communication system, in accordance with one embodiment of the present invention. The system 200 has a terminal 202 operably coupled to a content server 122 via connection 204. The terminal 202 is further coupled to a control server 126, via connection 206. Typically, these connections 204 and 206 are dynamically made.

The terminal 202 contains a plurality of input components and a plurality of output components and a control unit 104. The terminal 202 has a dialog manager 114 operably coupled to control unit 104, via connection 216 and further coupled to content server 122 and the control server 126. The dialog manager 114 is coupled to the plurality of input and output devices, through the control unit 104, via bus 214. FIG. 3 illustrates the terminal 202 having a speech detector/controller 146, an audio subsystem 216, a speech recognition engine 144, a handwriting engine 148 and a media module 218. These elements represent several of the various input and output devices which can be utilized within the terminal 202 and in conjunction with the dialog manager 114. The input and output components is an illustrative list only and not a comprehensive list as any other suitable input and output devices may be coupled to the dialog manager 114 via the bus 214 and the through the control 104.

Similar to the system of FIG. 2, the thick client allows a user to interact in a multi-modal system and receive control commands from a content server 122 or control command requests which are retrieved from the content server 122. The terminal 202 of FIG. 3 is recognized as a thick client because most input and output components are disposed on the terminal 202. When an information fetch request for a requested information is provided from an input device, such as the handwriting engine 148, to the dialog manager 114, via bus 214, the dialog manager 114 decodes the information requests and further provides the request to the content server 116, via connection 204 to retrieve the requested information. The dialog manager 114 decodes the requested information and parses out the control command, providing the control command to the control unit 104. The control unit 104 then modifies at least an input component and/or an output component based on the control command. In another embodiment of the present invention, the dialog manager 114 parses out a control command request from the retrieved information from the content server and retrieves the proper control command from the control server 126 via connection 114. Regardless of whether the control command is embedded in the retrieved information or is a link to the control server 126, once the dialog manager 114 receives the control command, it is forward to the control unit 104 where at least one of the input components or at least one of the output components is modified.

Figure 4:
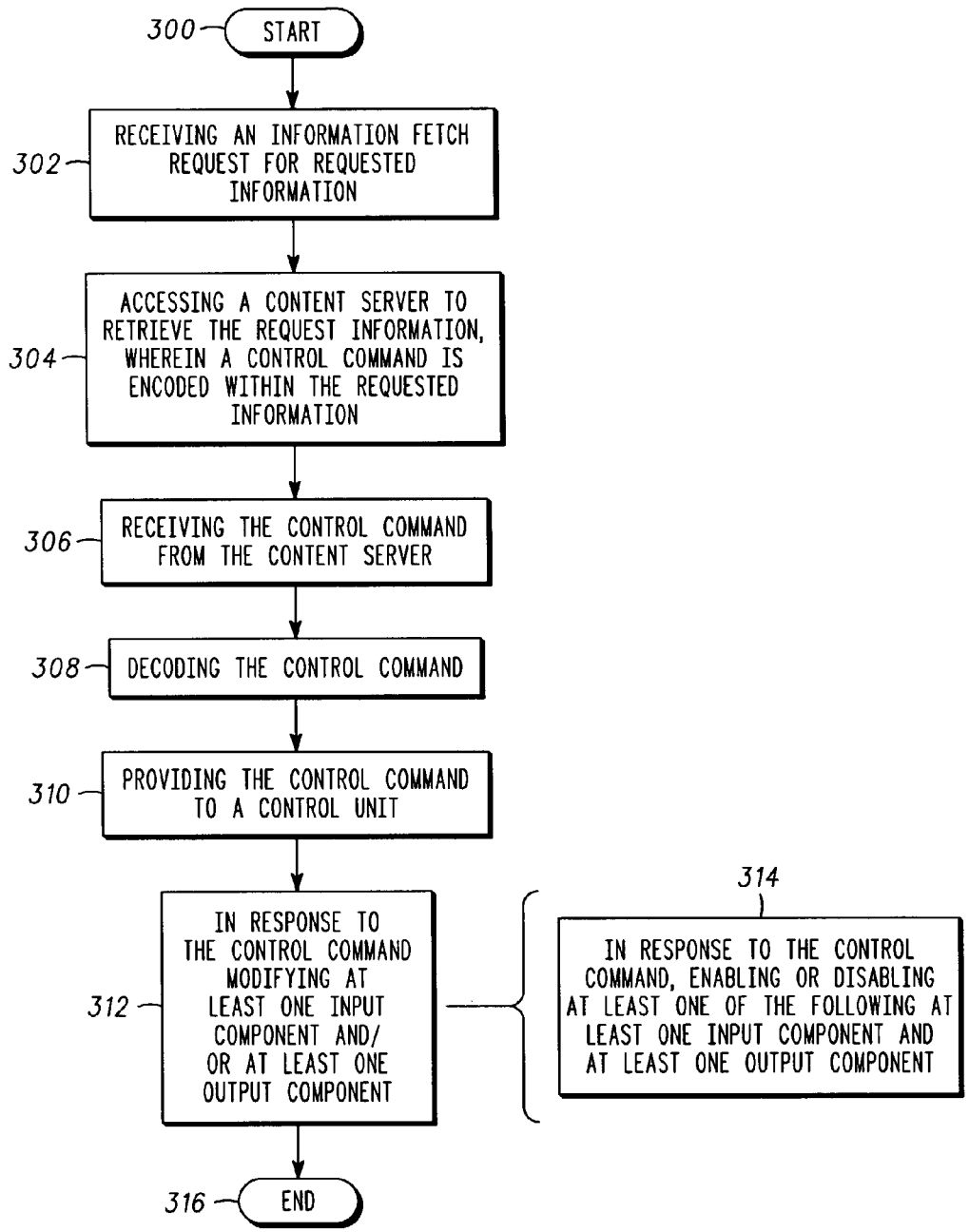
FIG. 4 illustrates a flow chart illustrating a method for multi-modal communications receiving a control command, in accordance with one embodiment of the present invention.

Referring now to FIG. 4, a flowchart illustrates a method for multi-modal communication receiving a control command. The method begins, 300, upon receiving an information fetch request for requested information 302. A typical example of an information request is a URI request, such as accessing a specific server on a network. The next step, 304, is accessing a content server to retrieve the requested information, wherein a control command is encoded within the requested information. Next, step 306, the control command is received from the content server, in combination with the requested information. In another embodiment, the requested information may contain a reference indicator wherein the dialog manager retrieves the control command from a control server based upon the reference indicator, as discussed below with reference to FIG. 5.

The control command is then decoded, designated at step 308. In one embodiment, decoding occurs when the control unit parses the control command from the requested information. The control command is then provided to a control unit, designated at step 310. In response to the control command, at least one input component and/or at least one output component is modified, designated at step 312. The step of modifying further comprises enabling or disabling at least one of the following: at least one input component and at least one output component, designated at 314. Once the components have been modified, the method is complete, designated at 316.

Figure 5:
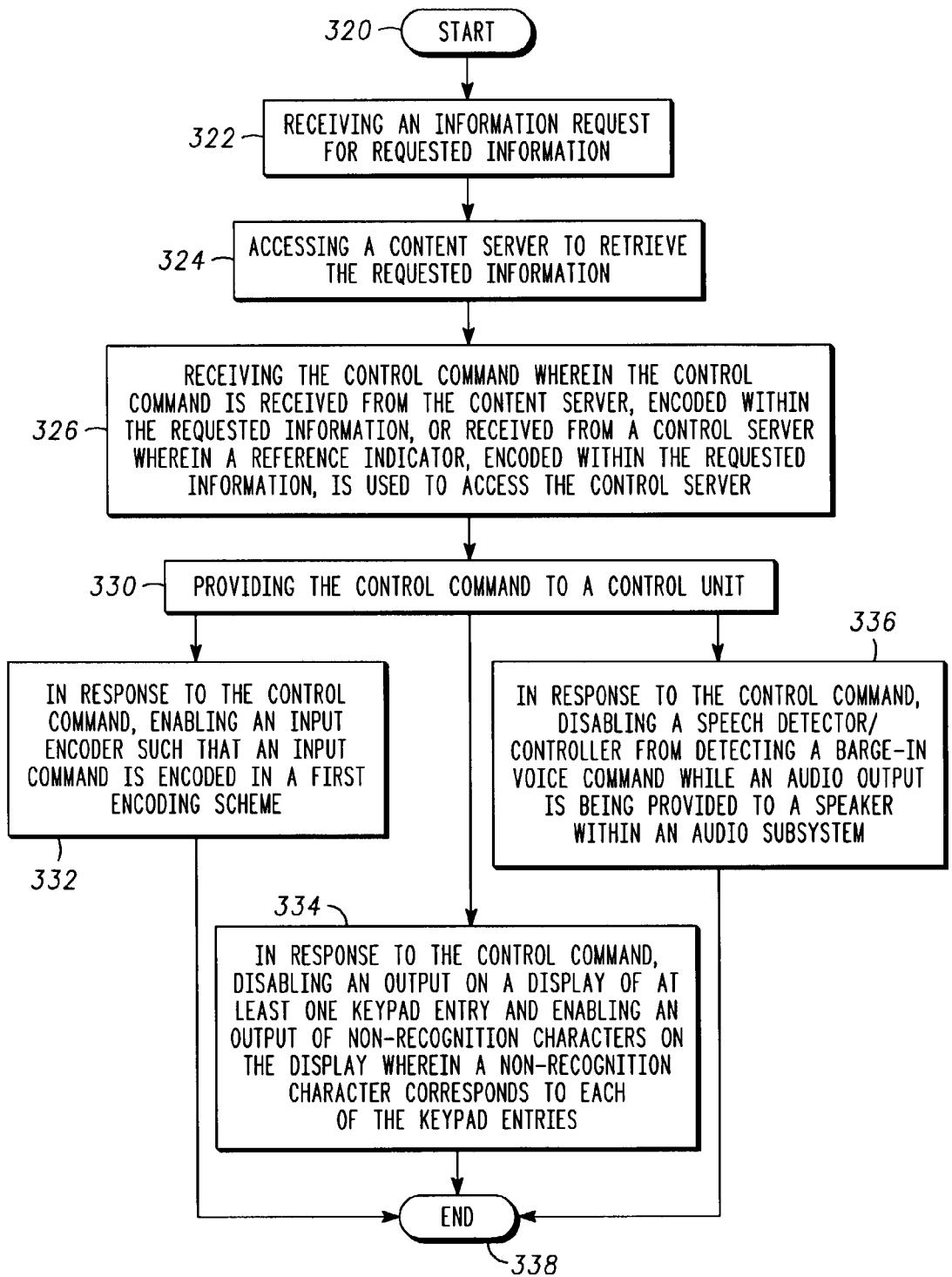
FIG. 5 illustrates a flow chart illustrating a method for multi-modal communication receiving a control command, in accordance with one embodiment of the present invention.

FIG. 5 illustrates another embodiment of the method for multi-modal communication of the present invention. FIG. 5 is similar to the method of FIG. 4, wherein FIG. 5 illustrates three specific examples of input and/or output component modifications. The method begins, 320, when an information fetch request for requested information is received, step 322. The system then accesses a content server to retrieve the requested information, designated at step 324. As discussed above with reference to FIG. 4, in one embodiment the control command is disposed within the requested information. In another embodiment, a reference indicator is disposed in the requested information, wherein the reference indicator, such as a URI, references a control command stored in the control server.

In the next step, 326, the system receives the control command. In one embodiment, the control command is received from the content server, in conjunction with the requested information, wherein the control command is encoded therein. In another embodiment, the control command is received from the control server wherein the reference indicator is encoded within the requested information and the dialog manager accesses the control server using the reference indicator to retrieve the control command. Thereupon, the control command is then provided to a control unit, step 330.

In one embodiment, in response to the control command, the system enables an input encoder such that an input command is encoded in a first encoding scheme, step 332. For example, the first encoding scheme may be a security encryption encoding scheme, such as a 64 bit encoding scheme, to encrypt the input. In another embodiment, designated at step 334, in response to the control command, an output on a display of at least one keypad entry is disabled and an output of non-recognition characters on the display is enabled, wherein the non-recognition character corresponds to each of the keypad entries. A typical non-recognition character is an asterisk, ampersand, number symbol, are any other character wherein the visible non-recognition character does not disclose the actual entered character. A common example of this embodiment is the manual entry of a PIN, wherein for security reasons, the actual PIN is not displayed on the screen.

In a third embodiment, in response to the control command, a speech detector/controller is disabled, thereby limiting user input via speech, while an audio output is being provided to a speaker within an audio subsystem, designated at 336. A common example of this embodiment may occur when a user access a server which requires a disclaimer to be provided to the user. By disabling the speech detector/controller, the system requires the user to listen to the disclaimer by not recognizing a barge-in voice command while the audio is being provided to a speaker in the audio subsystem, wherein a barge-in voice command is any user initiated audio noise which would typically activate the speech detector/controller, such as spoken command. After steps 332, 334 and 336, the method is completed, 338.

The present invention provides for an improved communication system, wherein a control command enables and/or disables specific input and/or output components. The communication system further provides for improved security and efficiency whereby a user does not have to be concerned about manually modifying the input and/or output components. Moreover, a content server, or other services, may be provided with an added level of security for the transference of sensitive information to or from an end user by activated specific encoding techniques and disabling various output devices, thereby prevent inadvertent disclosure to a third party.

It should be understood that the implementations of other variations and modifications of the invention and its various aspects as may be readily apparent to those of ordinary skill in the art, and that the invention is not limited by the specific embodiments described herein. For example, the dialog manager may be a graphical browser having voice browser capabilities or the content server and control server may be disposed within the same server. It is therefore contemplated to cover by the present invention, any and all modifications, variations, or equivalent to fall within the spirit and scope of the basic underlying principles disclosed and claimed herein.

What is claimed is:

1. A method for multi-modal communication comprising:
receiving a control command for an end user multimodal terminal from a content server;
decoding the control command by the multimodal terminal;
providing the decoded control command to a control unit of the multimodal terminal; and
in response to the decoded control command received from the content server, the multimodal terminal modifying at least one input component or at least one output component of the multimodal terminal such that the end user need not modify the at least one input or output component in response to the decoded control command.

2. The method of claim 1 wherein the step of modifying further comprises enabling or disabling at least one of the following: at least one input component and at least one output component of the multimodal terminal.

3. The method of claim 1 further comprising:
prior to receiving the control command, receiving an information fetch request for requested information and fetching the requested information from a content server, wherein the control command is encoded within the requested information and controls an input or output component of the multimodal terminal.

4. A method for multi-modal communication comprising:
receiving an information fetch request for requested information;
accessing a content server to retrieve the requested information;
receiving a control command by an end user multimodal terminal wherein the control command is either from the content server and the control command is encoded within the requested information, or the control command is received from a control server using a reference indicator encoded within the requested information; and
providing the control command to a control unit of the end user multimodal terminal and in response to the control command, modifying at least one input component or at least one output component of the multimodal terminal such that the end user need not modify the at least one input or output component in response to the control command.

5. The method of claim 4 further comprising:
in response to the control command, enabling an input encoder such that an input command is encoded in a first encoded scheme.

6. The method of claim 4 wherein modifying comprises:
in response to the control command, disabling a speech detector/controller from detecting a barge-in voice command while an audio output is being provided to a speaker within an audio subsystem.

7. The method of claim 4 wherein modifying comprise:
in response to the control command, disabling an output on a display of at least one keypad entry and enabling an output of non-recognition characters on the display wherein a non-recognition character corresponds to each of the keypad entries.

8. A system for multi-modal communication comprising:
at least one dialog manager;
a content server operably coupled to the at least one dialog manager;
a control unit of an end user multimodal terminal operably coupled to the dialog manager wherein the dialog manager receives a control command from the content server, decodes the control command from the content server and provides the control command to the control unit of the end user multimodal terminal;
at least one input component operably coupled to the control unit; and
at least one output component operably coupled to the control unit wherein the control unit, in response to the control command, either enables the at least one input component, enables the at least one output component, disables the at least one input component, or disables the at least one output component such that the end user need not modify the at least one input or output component in response to the decoded control command.

9. The system of claim 8 wherein the control command is encoded in a mark-up language.

10. The system of claim 8 wherein the input component is at least one of the following: a microphone disposed within an audio subsystem, a speech detector/controller, a speech recognition engine, a keypad, an input encoder, touchscreen, and a handwriting engine.

11. The system of claim 8 wherein the output component is at least one of the following: a speaker disposed within the audio subsystem and a display.

12. A system for multi-modal communication comprising:
an end user multimodal terminal having at least one input component and at least one output component;

a gateway having a dialog manager operably coupled to the at least one input component and the at least one output component of the multimodal terminal;

a content server operably coupled to the dialog manager wherein the content server provides the dialog manager with a control command for the multimodal terminal; and wherein the multimodal terminal controls modification of at least one input component or one output component of the end user multimodal terminal in response to the control command such that the end user need not modify the at least one input or output component in response to the control command.

13. The system of claim 12 wherein the at least one input component and the at least one output component are operably coupled to a terminal control unit disposed within the multimodal terminal and the terminal control unit is operably coupled to a gateway control unit disposed within the gateway.

14. The system of claim 13 wherein the dialog manager decodes the encoded control command and thereupon provides the control command to the gateway control unit.

15. The system of claim 14 wherein the gateway control unit provides the terminal control unit the control command and the terminal session control unit, in response to the control command, does at least one of the following: enables the at least one input component, enables the at least one output component, disables the at least one input component, and disables the at least one output component.

16. The system of claim 15 wherein the input component is at least one of the following: a microphone disposed within an audio subsystem, a speech detector/controller, a speech recognition engine, a keypad, an input encoder, touchscreen, and a handwriting engine.

17. The system of claim 15 wherein the output component is at least one of the following: a speaker disposed within the audio subsystem and a display.

18. A system for multi-modal communication comprising:
an end user multimodal terminal having at least one input component, at least one output component, and a dialog manager operably coupled to the at least one input component and the at least one output component;

a content server operably coupled to the dialog manager, wherein the content server provides the dialog manager of the end user multimodal terminal with a control command;

wherein the at least one input component, the at least one output component and the dialog manager are operably coupled to a control unit disposed within the terminal and wherein the dialog manager decodes the encoded control command to generate a decoded control command and provides the decoded control command to the control unit; and wherein the control unit, in response to the decoded control command, either enables the at least one input component, enables the at least one output component, disables the at least one input component, or disables the at least one output component such that the end user need not modify the at least one input or output component in response to the decoded control command.

19. The system of claim 18 wherein the input component is at least one of the following: a microphone disposed within an audio subsystem, a speech detector/controller, a speech recognition engine, a keypad, an input encoder, touchscreen, and a handwriting engine and wherein the output component is at least one of the following: a speaker disposed within the audio subsystem and a display.

20. A multimodal terminal comprising:
at least one input component, at least one output component;

a dialogue manager operatively coupled to the at least one input component and the at least one output component;

a control unit, operatively coupled to the input component and the output component and the dialogue manager, wherein the dialogue manager decodes an encoded control command received from a content server to generate a decoded control command and wherein the control unit, in response to the decoded control command, either enables at least one input component, enables at least one output component, disables at least one input component, or disables at least one output component; wherein the encoded control command is encoded in requested information from the content server such that the end user need not modify the at least one input or output component in response to the decoded control command.

21. The method of claim 20 further comprising:
in response to the control command, enabling an input encoder such that an input command is encoded in a first encoded scheme.

22. The method of claim 20 further comprising:
in response to the control command, disabling a speech detector/controller from detecting a barge-in voice command while an audio output is being provided to a speaker within an audio subsystem.

23. The method of claim 20 further comprising:
in response to the control command, disabling an output on a display of at least one keypad entry and enabling an output of non-recognition characters on the display wherein a non-recognition character corresponds to each of the keypad entries.

24. A method for multi-modal communication comprising:
receiving a control command for a multimodal terminal from a content server;

decoding the control command received from the content server by the multimodal terminal;

providing the decoded control command to a control unit of the multimodal terminal;

in response to the decoded control command, modifying at least one input component or at least one output component of the multimodal terminal such that the end user need not modify the at least one input or output component in response to the decoded control command;

wherein the step of modifying further comprises enabling or disabling at least one of the following: at least one input component and at least one output component of the multimodal terminal; and prior to receiving the control command, receiving an information fetch request for requested information and fetching the requested information from a content server, wherein the control command is encoded within the requested information and controls an input or output component of the multimodal terminal.

25. A method for multi-modal communication comprising:
receiving a control command for a mobile multimodal terminal from a content server wherein the control command is encoded in a mark-up language;

decoding the control command received from the content server by the mobile multimodal terminal;

providing the decoded control command to a control unit in the mobile multimodal terminal;

in response to the decoded control command, modifying at least one input component or at least one output component of the mobile multimodal terminal such that the end user need not modify the at least one input or output component in response to the decoded control command;

wherein the input component is at least one of the following: a microphone disposed within an audio subsystem, a speech detector/controller, a speech recognition engine, a keypad, an input encoder, touchscreen, and a handwriting engine; and wherein the output component is at least one of the following: a speaker disposed within the audio subsystem and a display.

* * * * *